Figure 1:
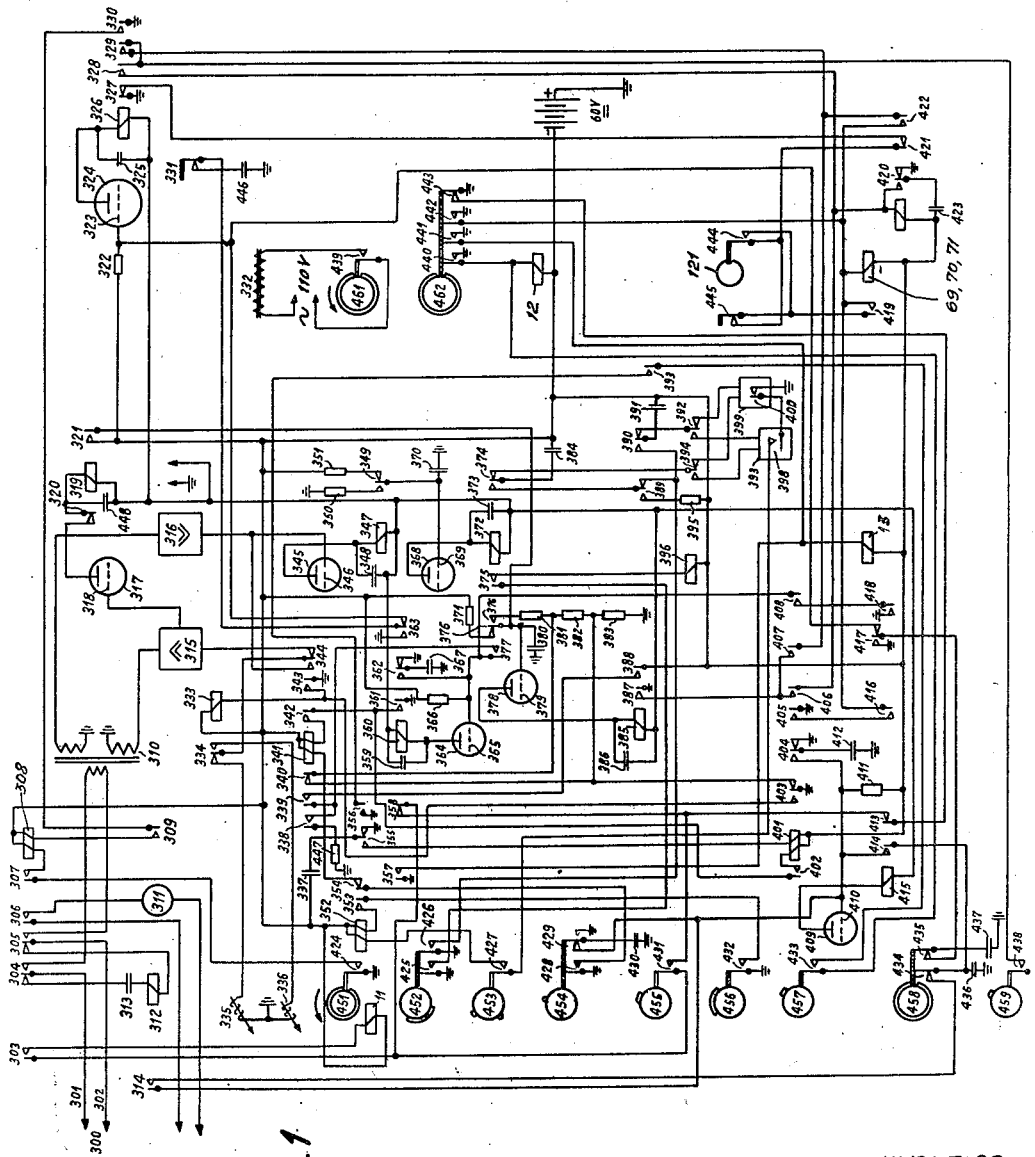

Feb. 19, 1957  M. G. HANDSCHIN ET AL  2,782,255
TELEPHONOGRAPH
Filed Dec. 31, 1951  6 Sheets-Sheet 1

INVENTORS.
M. G. Handschin
W. Spieser
By Bryant + Lowry
Attys

Feb. 19, 1957 M. G. HANDSCHIN ET AL 2,782,255
TELEPHONOGRAPH
Filed Dec. 31, 1951 6 Sheets-Sheet 3
Fig. 3
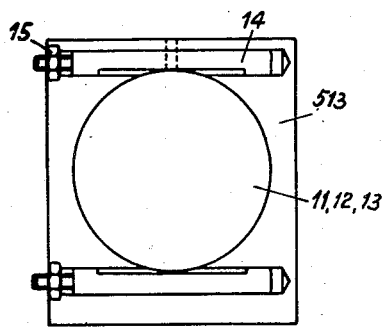
Fig. 4
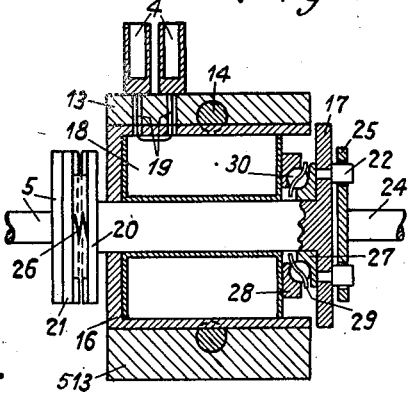
Fig. 5
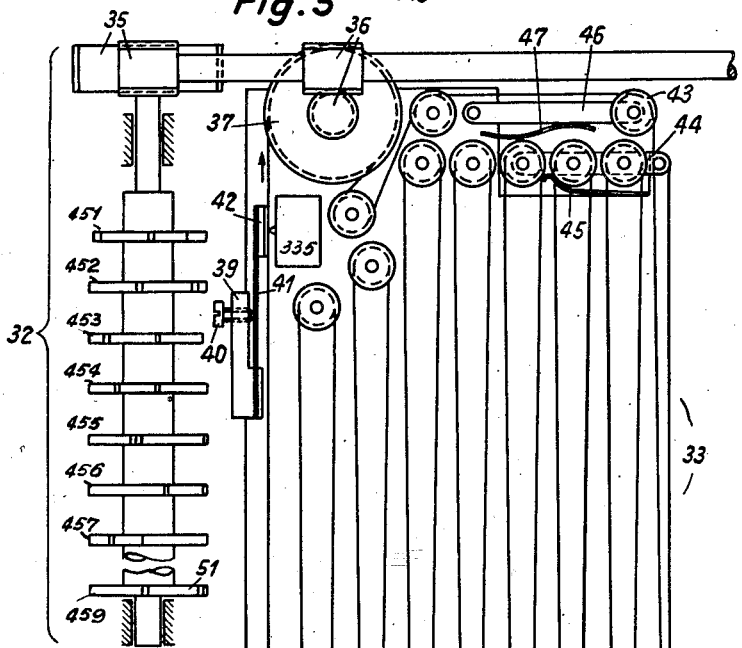
Fig. 12
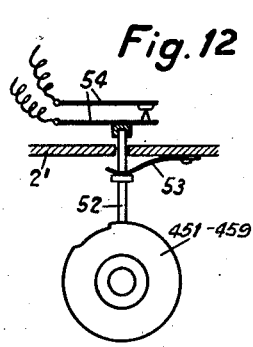
INVENTORS:
M. G. HANDSCHIN
W. SPIESER
ATTYS.

Feb. 19, 1957  M. G. HANDSCHIN ET AL  2,782,255
TELEPHONOGRAPH
Filed Dec. 31, 1951  6 Sheets-Sheet 4
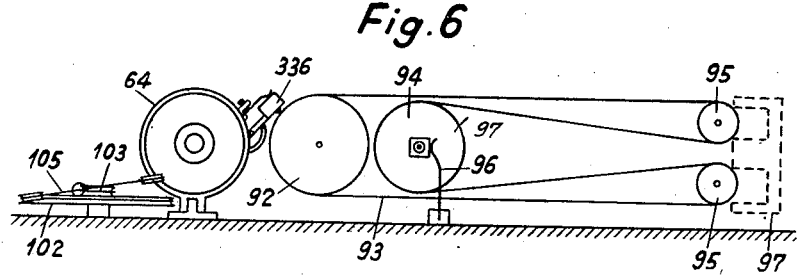
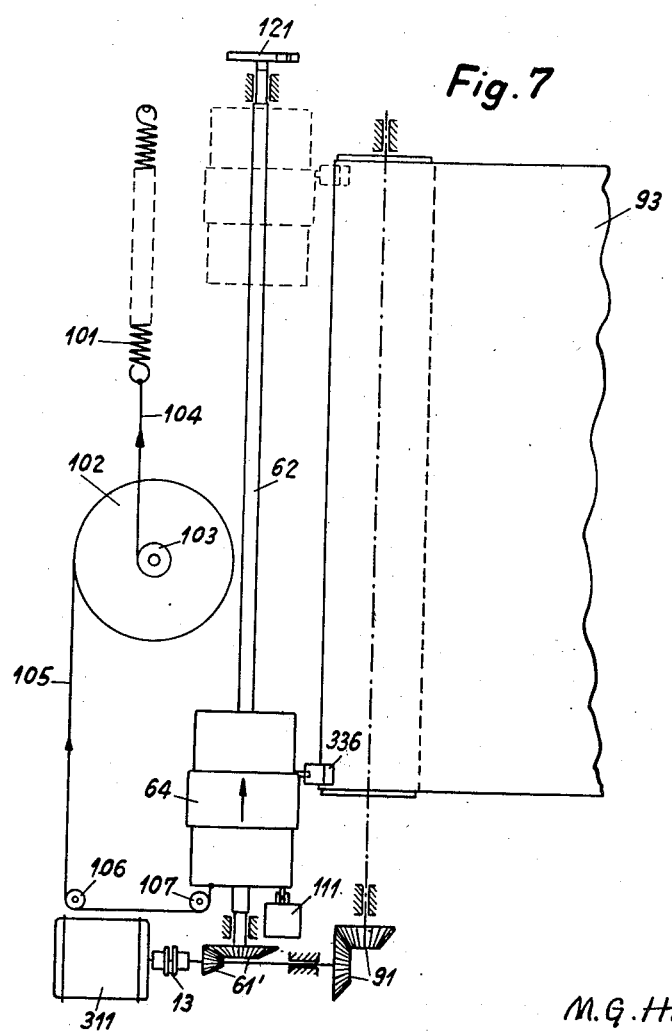
INVENTORS.
M.G. Handschin
W. Spieser Feb. 19, 1957 M. G. HANDSCHIN ET AL 2,782,255
TELEPHONOGRAPH
Filed Dec. 31, 1951 6 Sheets-Sheet 5
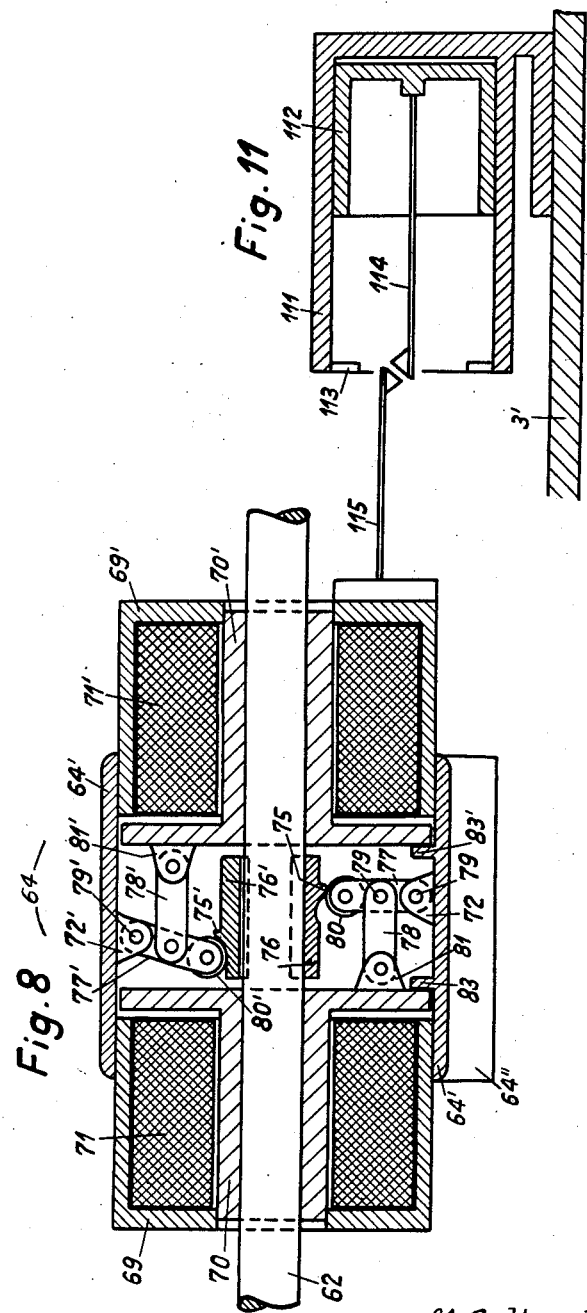
INVENTORS:
M. G. Handschin
W. Spieser
By Bryant & Lowry
attys.

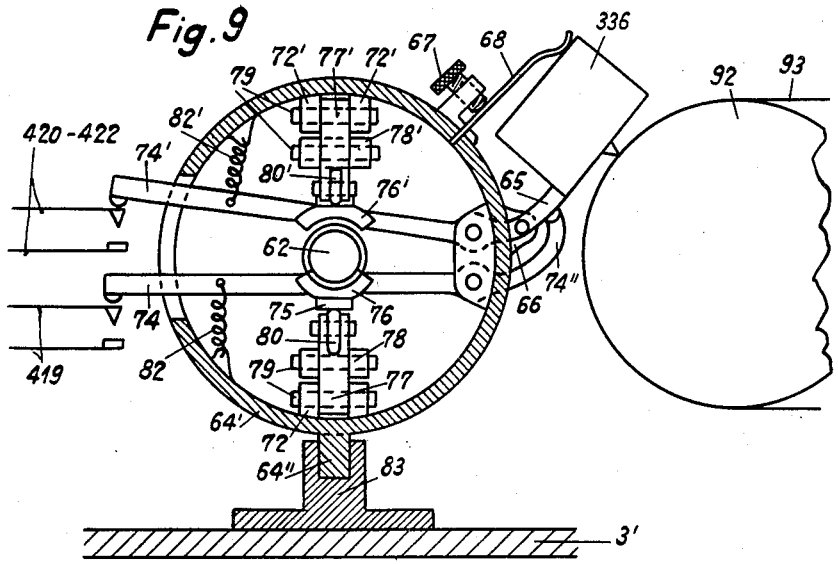
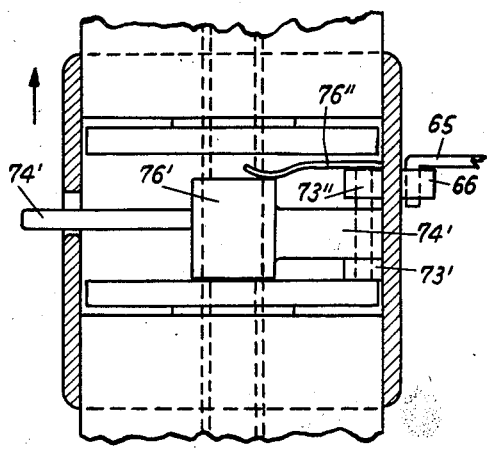

United States Patent Office 2,782,255
Patented Feb. 19, 1957

2,782,255
TELEPHONOGRAPH

Max G. Handschin, Kusnacht, near Zurich, and Walter Spieser, Zurich, Switzerland, assignors to Promundo, Schaan, Liechtenstein Application December 31, 1951, Serial No. 264,318

18 Claims. (Cl. 179—6)

Telephonographs, i. e. devices which automatically answer for the subscriber when his number is called, ask the caller to speak and then record the communication by electro-magnetic means, are in general already known. They also enable the owner to listen to the communication at any time and from any place and to cancel it, so that the telephonographs are again fully available for fresh recordings.

But those telephonographs which are already known have quite a number of disadvantages. E. g. the usual accumulation of mechanical parts, such as gears, couplings, etc. in one casing is very inconvenient, because it makes them inaccessible, so that one can get at them only after a large part of the machinery has been taken to pieces. Also, the usual construction of the couplings of the call, recording, and cancellation controls, which are usually electro-magnetic friction couplings, involves a disproportionately large output of the corresponding coupling magnets. These couplings are also comparatively heavy, their inertia is large, and they require strong supports to resist the forces produced by them. Another disadvantage is the employment of complicated reversing gears for the sound carrier. Also, the telephonographs which are already known have a line spacing mechanism which does not work accurately, so that it is not possible to make full use of the sound carrier for recording. In the case of disk type sound carriers (records), their moment of inertia has been found to be inconveniently large, so that it causes difficulties if the record is started up quickly. These sound carriers have also the disadvantage that the diameter of the recording is variable, so that the speed of the sound path with respect to the speaking head also varies. There is another inconvenience in the operation of the already known telephonographs: if one requires a repetition of a part of the text which was not understood, one has to listen to the complete repetition of that part of the record on the sound carrier which precedes the required part of the text.

The present invention deals with a telephonograph in which all these disadvantages are eliminated by providing it with a replying device, a recording and reproduction device, a cancellation device and an automatic mechanism for the control of these devices, which comprises several amplifiers, and where these devices are arranged in groups in separate casings, which are placed one upon another. The different groups are connected by members which permit the transmission of the impulses by mechanical means. The replying device, the recording and reproduction device, and the cancellation device are in the lower casing, the automatic device (without amplifiers) in the intermediate casing, and the amplifiers in the top casing. The connecting members, which transmit the impulses between the groups by mechanical means, replace the electric leads in the mechanical parts.

The attached drawing shows diagrammatically an example of a construction in accordance with this invention.

Figure 2:
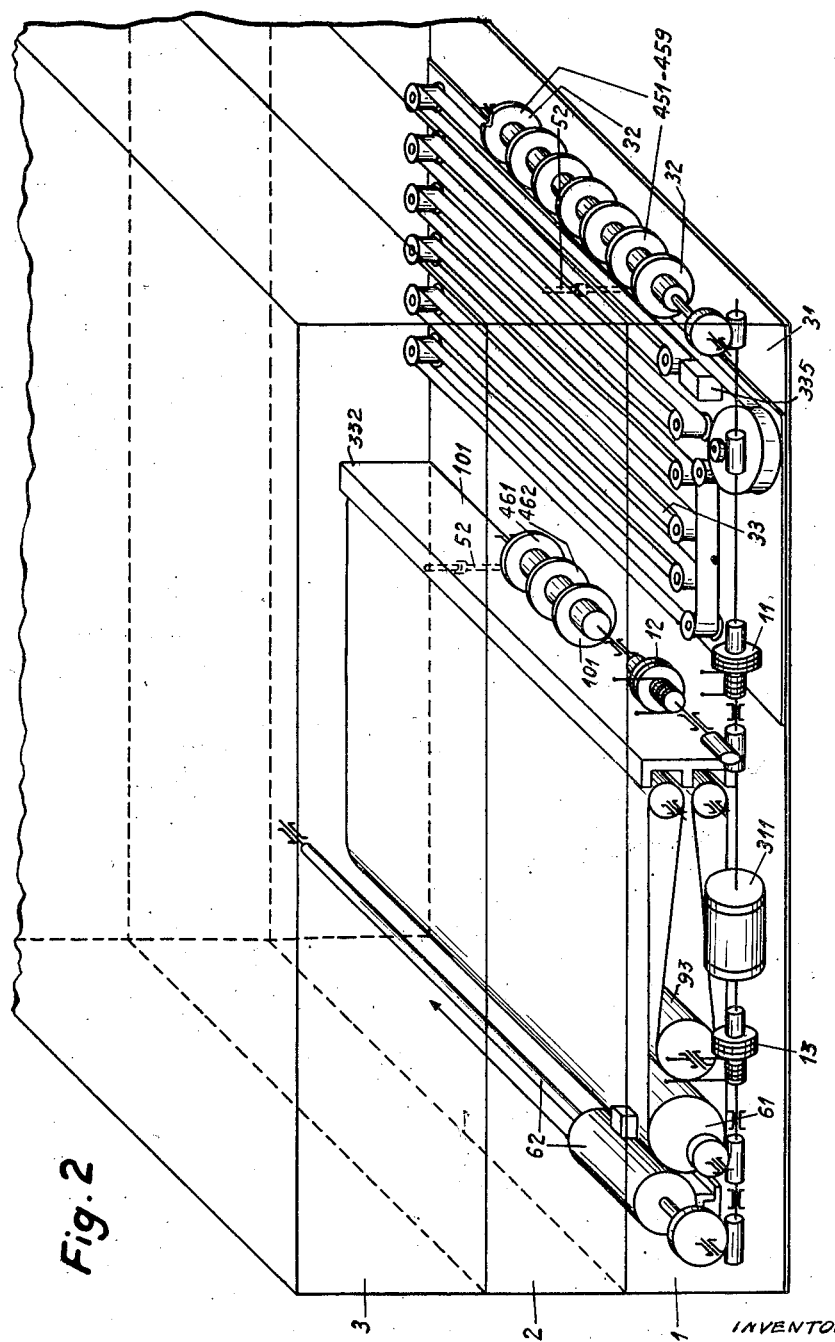

Fig. 1 is a circuit diagram of a telephonograph,
Fig. 2 is an example of a layout,
Fig. 3 shows a housing for a coupling,
Fig. 4 shows a coupling.
Fig. 5 is a plan view of a replying device,
Fig. 6 is a side view of a recording and reproducing device,
Fig. 7 is a plan view to Fig. 6,
Fig. 8 is a longitudinal section of a sound head advance mechanism,
Fig. 9 is a cross-section to Fig. 8,
Fig. 10 shows a returning mechanism,
Fig. 11 shows a return motion damper,
Fig. 12 shows the mechanical operation of a cam-controlled contact.

The invention will be explained by referring to Fig. 1, which is a circuit diagram for a construction which is an example of the present invention.

If any subscriber of the telephone network, who is connected to the telephonograph shown in Fig. 1 rings, certain already known devices will make a connection between this subscriber and the telephonograph over a line 300, i. e. wires 301 and 302. The ringing current from the telephone network will excite a relay 312 through the contacts 304, 305, and a condenser 313. Relay 312 now closes its contacts 314 and 309, but contact 309 still remains ineffective, while a relay 415 is excited through a contact 413. It is the function of this relay to check the number of call signals which are required to put the telephonograph in circuit. This is done by connecting a condenser 436 through the contact 434 of a cam 458 to the controlling grid 410 of a valve 409, so that it is slowly charged through a resistance 411. But as relay 312 releases because of the ringing current, relay 415 will keep itself above its contact 414, i. e. condenser 436 will remain connected to the control grid 410, so that also relay 415 remains in the "on" position. Let us assume that the operating delay of relay 415 is about 3 secs. During this time a condenser 437, connected to control grid 323 of valve 324, will discharge through contacts 417 and 435 of cam 458. As soon as condenser 436 is charged, relay 415 will become dead again and the discharged condenser 437 will again be connected to the control grid 323 of valve 324. This will excite a relay 326, so that its operating delay depends on a resistance 322. Let us assume that this delay is about 10 secs. If there was during this time no further call from the telephone exchange, relay 326 would become dead again. This connection has the important advantage that it can be used to replace more expensive and unreliable mechanical timing units. These relays will be used for other purposes as well. For this reason the two condensers 436 and 437 are connected through the contacts 434 and 435 of cam 458, which serve to disconnect them while the telephonograph is running.

If now a further ringing current arrives while relay 326 is excited, relay 308 will be excited through earth, contact 330, contact 309, operating winding of relay 308, and its contacts 303 to 307 will be closed or changed over. An electro-magnetic coupling 11 will be excited through the contact 303 which causes the cams 451 to 459 by a well-known method to begin slowly to move in the direction indicated by the arrow. Relay 308 will be kept above the circuit earth, contact 424 of cam 451, contact 307 of relay 308, holding winding of relay 308 and battery. The cams are driven by a motor 311 which is supplied with current through contact 306. A line 300 is switched off from relay 312 by relay 308 and connected to a repeater 310. Opening of contact 435 makes relay 326 again dead. The caller now hears in the usual manner the replying device 31 through a reproduction amplifier 315 in the following circuit: speaking head 335, contacts 334 and 344, reproduction amplifier 315, repeater 310 and line 300.

As a first example, let us assume that the caller wants to speak a message into the telephonograph. The caller hears in the known manner name and address of the owner, and a request to speak by the replying device. When he has heard this request, the replying device 31 or the cams 451 to 458 are in that position in which cam 454 has closed and changed over the contacts 428 and 429. A relay 341 is excited through earth, contact 428, contact 354, relay 341 and battery, and a discharged condenser 430 is connected through contact 429 to the control grid of valve 409. The anode voltage of this valve will again excite relay 415. As long as this relay remains excited, the replying device 31 and the clutch 11 are dead, as contact 413 is open. Relay 415 remains excited during e. g. 7 secs., so that the caller has enough time available to comply with the request to speak. If he does not do so, the replying device 31 and the cams 451 to 458 run into the initial position and the line 300 is disconnected from the repeater 310. If, however, the caller speaks in time, his messages will be recorded on a sound carrier 93 (see Fig. 2) which forms part of the recording and reproducing device. The speech impulses are transmitted through an adjustable amplifier 316 and through contacts 344, 334 to the sound head 336. When relay 333, which actuates contact 334, is excited, sound head 335 is disconnected. The speech impulses get at the same time also to the grid of valve 345, which excites a relay 347. This relay serves to watch over the impulses. It operates without delay and flickers as long as the caller is speaking. This method renders all disturbing noises ineffective, without the use of expensive filters. The alternating connection of two resistances 350, 351 to the grid of a valve 368 makes it impossible for the disturbing noises, which have in by far the greatest number of cases a duration of not more than 200 ms., to excite the relay 372, because the resistance 350 is designed to make the operating delay of relay 372 200 ms. Relay 372 can be excited only if the change-over switch 349 remains in one of its positions for more than 200 ms. Resistance 351 gives relay 372 a release delay. By closing contact 377 of relay 372 another relay 360 is excited over earth, resistance 447, contacts 338 and 377, grid 365, valve 364. This relay has the function to fix a certain constant period of time from the last spoken word. This method will replace here, too, the usual mechanical timing unit. In our example the relay releases about 7 seconds after the last impulse from relay 347. This delay enables the caller to make a pause between two sentences. The release delay of relay 360 is obtained by a condenser 367 which is connected by relay 360 to the grid of valve 364. This condenser is always discharged again through contact 377, i. e. every time when relay 372 is excited.

Now the electro-magnetic clutch 13 of the recording and reproducing device is excited, i. e. the sound carrier 93 (see Fig. 2) is set in motion. Clutch 13 is excited by way of contact 357. The messages are recorded by electro-magnetic means on the sound carrier. Clutch 11 of the replying device remains excited, in spite of the release of relay 415 and the opening of contact 358 of relay 360, until contact 431 of cam 455 opens. Cam 459 closes contact 438, which earths contact 328, 329. Relay 341 is kept above the circuit earth, contacts 361 and 342, relay 341, and battery. If now the caller does not speak for about 7 seconds, or rings off, the impulse relay 347 will receive no more impulses and, consequently, relay 372 will become dead, and after 7 seconds relay 360 will become dead too. The latter has discharged the condenser 446 through its change-over switch 363. When relay 360 becomes dead, the discharged condenser 446 is again connected to grid 323 of valve 324, the connection being from condenser 446 through limit switch 331, contact 363, resistance 322, battery. This will excite relay 326 for a short period, the duration of the excitation depends on the capacitance of condenser 446 and on the resistance 322. The momentary excitation of relay 326 will cause a speaking head drive 64 (see Fig. 2) to be put back by one groove on spindle 62, i. e. practically to the last spoken word. This method obtains the largest possible utilisation of sound carrier 93. Through contacts 438 and 328 a magnet (69', 70', 71') is excited, while another magnet (69, 70, 71) can be excited only through contacts 438, 329, 422, when the first magnet has actuated its contacts 420 to 422. When now relay 326 becomes dead again, magnet (69, 70, 71) releases immediately, but magnet (69', 70', 71') remains excited for a short while until condenser 423 is discharged. The relays 333 and 341 have also released owing to the discharge of relay 360. This method avoids expensive reversing gears. The cams of the replying device return to their initial positions. Relay 308 becomes dead, line 300 is disconnected from the repeater 310, and the equipment is again in its rest position.

In the case of certain telephone systems the telephonograph does not immediately release the telephone line, so that a buzzing sound arrives at the telephonograph from the exchange through the telephone line. This keeps relays 347 and 372 constantly excited. This buzzing sound is of course also recorded on the sound carrier 93 and may cover it completely. It is usual to avoid this drawback by the installation of filters, but this solution is not quite satisfactory because they cannot keep out all the frequencies concerned. Compared with that, the present scheme of connections is reliable, simple, and cheap.

When the caller has spoken a message, the relays 308, 333, 341 and 360 are excited, as already explained. If he now rings off, and if we assume that the telephonograph is connected to a telephone network where this will make a new connection with the exchange, the buzzing sound from the exchange will excite the relay 347 continuously, so that also relay 372 will be excited. Now there is another relay 385 provided, which can have three different operating delays, as it can be connected to three different resistances 381, 382 and 383. Excitement of relay 341 will also cause contact 340 to be opened, i. e. the resistances 381, 382 will be connected through contact 376 to the condenser 380. The condenser 380, which was charged in the rest position (resistance 371, contact 376) will discharge slowly, with a speed which depends on the resistances 381 and 382, e. g. in 6 seconds. Only after this time relay 385, which is in the anode circuit of valve 378, will be excited. It closes its contact 388, so that the grid of valve 364 obtains a negative voltage through battery, contact 388, contact 389 and contact 377. In consequence, relay 360 will become dead immediately. Speaking head 336 is put back, as already explained.

For a further example let us assume that the owner of the telephonograph wishes to listen to the messages which have arrived during his absence. We assume as known that a reproduction is initiated by means of a coding device 397 which is not shown in detail in the drawing. If the reproduction is initiated in the correct manner, a contact 398 is closed, and if it is not done in the correct manner, a contact 400 of a locking device 399 is opened, so that the reproduction is impossible. Here the initiation is obtained correctly by speaking a short word and a long one. If the owner, having heard name and address, speaks the first code word, the cams 451 to 459 of the replying device are in that position in which the contacts 425 and 426 of the cam 452 are closed. The relay 347 is excited through the adjustable amplifier 316. As the short code word has a duration of more than 200 ms., relay 372 is also excited. But relay 385 is not excited, because the impulse duration of the short code word, in comparison with the operating delay of this relay, as determined by the resistances 381 and 388 (resistance 382 is ineffective because of the closed contact 340) is too short. During the excitation of relay 372 the condenser 384 is charged through earth, contact 426 of cam 452, contacts 389 and 374, condenser 385 and battery. Also, a relay 396, which has a short release delay, is excited through earth, contact 425 of cam 452, contact 375, relay 396, battery. As soon as the pronunciation of the first code word is completed, relay 347 releases immediately, followed by the slightly release-delayed relay 372. This will cause condenser 384 to discharge through the contacts 374, 394 and the coding device 397. If now the owner speaks the second, long code word, the relays 347 and 372 are excited again. This time the relay 385 will be excited, too, through earth, contact 403, resistance 381, contact 376, condenser 380, or grid 379 of valve 378. Condenser 384 cannot be charged, because the contact 389 connects a resistance 395 to the battery. But a condenser 391 is charged through earth, contact 426 of cam 452, contact 390, condenser 391, and battery. As soon as the owner has pronounced the second code word, the relays 347, 372, and 385 will become dead again. The condenser 391 discharges through the coding device 397. As also the second code word was pronounced correctly, contact 398 has closed. Meanwhile the replying device has continued to run and excited a relay 352 as soon as cam 453 closes its contact 427. This happens in the circuit earth, contacts 400, 398, 427, relay 352, battery; and relay 352 is kept over earth, contact 432, contact 353, relay 352, battery. Contact 354 prevents the excitation of relay 341 and the condenser 337 discharges through relay 401. The change-over relay 333 of the speaking head is excited through earth, contact 403, relay 333, battery. The speaking head 335 is disconnected from the replying device, and in its place the speaking head 336 is connected to the reproduction amplifier 315.

Now the speaking head drive 64 (see Fig. 2) has to go into its zero position so that the owner can hear the messages. In those telephonographs which have already become known it was necessary to turn the sound carrier back into its initial position, which required a waiting time of up to one minute. In the case of the present telephonograph the sound carrier moves only in one direction. The speaking head 336 is returned as follows: excitement of magnet (69, 70, 71) loosens a locknut 76 (see Fig. 8) on a threaded spindle 62 and the speaking head is returned in less than 500 ms. into its zero position. After the excitation of relay 401 the relay 415 will be excited for a short period, while through its contact 416 magnet (69, 70, 71) is also excited for a short while. Relay 360 is now likewise excited through earth, contacts 418, 408 and grid 365. During all this time relay 401 is held over earth, contacts 361 and 402, holding winding of relay 401, battery. The impulses emanating from the sound carrier 93 are watched by the relays 347 and 372, which were already mentioned. Relay 360 is now held as during the recording of a message and releases only about 7 seconds after the last impulse. After that relay 415 becomes dead again.

When speaking head 336 is returned, it is essential that it comes in engagement exactly at the initial point of the sound track. As Fig. 7 shows, there is a cam 121 provided which opens contact 444 (see Fig. 1) always when the speaking head has attained its correct position. Magnet (69, 70, 71) is now held over earth, contacts 327, 421, 444 and 419, magnet (69, 70, 71) and battery. As soon as cam 121 opens contact 444 again, this magnet becomes dead and locknut 76 engages again with the threaded spindle 62 in accordance with the correct relative positions of speaking head and sound track.

The caller now hears the reproduction. The electromagnetic clutch 13 is here again excited through contact 357. If the caller did not understand a part of the text properly, he has only to pronounce a certain code word, e. g. "Repeat" and the speaking head is put back by one sound track groove. The reproduction is now amplified in the reproduction amplifier 347 and transmitted to the repeater 310 of line 300. But the speech impulses get also from the repeater to the adjustable amplifier 316 and to the impulse watching relay 347. By the pronunciation of the comparatively long word "Repeat" the relays 347 and 372 remain excited for a long time so that now relay 385, too, is excited through earth, resistances 381 and 382 (resistance 382 is shorted through contact 340) contact 376, condenser 380 or grid 379. It is here quite permissible for relay 347 to release occasionally for short periods, e. g. if certain consonants are pronounced, as this has no further effect because of the release delay of relay 372. The excitation of relay 385 is only of short duration. Now magnet (69′, 70′, 71′) is excited through the contacts 387 and 406, and the speaking head is put back by one pitch of the threaded spindle and locknut 76′ at once engages again with the threaded spindle 62. Now magnet (69, 70, 71) is excited through earth, contacts 387, 407, 422, magnet (69, 70, 71), battery. If the caller has ceased speaking, relay 385 becomes dead and the magnets (69, 70, 71) and (69′, 70′, 71′) becomes dead in that sequence, because the latter magnet has a long release delay owing to condenser 423. The caller consequently hears immediately the desired part of the text.

A relay 319 is provided to prevent an unintentional repetition by words recorded on the sound carrier 93 which are capable of initiating a repetition. This has an operating delay which is about 200 ms. smaller than the operating delay of relay 385 so that relay 319 is momentarily excited only in the case of relatively long words. The operating delay of relay 319 is maintained by a condenser 448. It is always charged and immediately discharged again through the winding of relay 319. If, however, the impulses are sufficiently long, relay 319 will be excited, which causes grid 379 of valve 378 to receive a negative voltage. Consequently, condenser 380 will be charged again. When this happens, the anode current to relay 385 is interrupted. Relay 319 therefore releases over its own contact 320. This is sufficient to neutralise the operating delay of relay 385. Consequently, it can never happen that an unintentional repetition is initiated by comparatively long words on the sound carrier 93.

When the reproduction is completed, i. e. when the impulse watching relay 347 received no more impules, relay 360 releases after about 7 seconds. This will produce a momentary excitation of relay 326 through the discharged condenser 446 and the contact 363. The speaking head drive 64 is again put back, as during the recording, by one pitch on the threaded spindle. The relays 401 and 333 now, too, become dead. The replying device 31 (see Fig. 2) continues to run and the caller hears in the known manner a cancellation request. If he does not say anything, the replying device runs into its initial position and all relays become dead. If the owner wants to cancel the messages, he speaks after the cancellation request the word "Cancel." The replying device is then with its cams in that position in which contact 433 is closed. As the pronounced word has two syllables, relay 385 will respond again. A clutch 12 of a cancelling device 101 (see Fig. 2) is excited through earth, contacts 356, 393, and contact 433 of cam 457, and will be kept over contact 440. By closing contact 439 of cam 461 a cancelling magnet 332 is excited and all records of the sound carrier 93 are cancelled. At the same time clutch 13 is excited through contact 441 and sound carrier 93 is set in motion. As soon as contact 443 of cam 462 opens, the sound carrier 93 of replying device 31 stops, and through contact 442 of the same cam the speaking head drive 64 is returned into the zero position. After about 3.5 seconds the cancellation is completed and the contacts are again separated. Magnet (70, 69, 71) remains still excited until cam 121 opens its contact 444 so that locknut 76 firmly engages the threaded spindle. The replying device too runs into its initial position and all circuits are interrupted. Line 300 is again ready for a new call. For the case where the recording capacity of the sound carrier 93 is completely taken up, a contact 331 is provided which separates condenser 446 and thus prevents an unintentional return motion of the speaking head drive 64.

Fig. 2 shows an example of a construction of the described installation. The frame of the apparatus consists of three separable casings. In a lower casing 1 is the mechanical part of the installation, which forms the main subject of the present invention. All parts are fixed to a base plate 1'. Above this, the automatic devices are in a casing 2. This has the advantage that practically no electric leads are required in the mechanical part. All leads from the mechanical parts are taken up vertically into the section with the automatic devices, through plugs and sockets. In the top casing 3 are the amplifiers. The casings 2 and 3, too, have each a base plate 2', 3'. All three casings are provided with guide bars and support posts in the corners, which are used to connect the three parts. As the three sections are separable without difficulty, all parts of the equipment can be reached directly and conveniently. The installation of the amplifiers in the top section 3 has that advantage that the heat produced by the various electronic valves is easily conducted away, without interfering with the apparatus in the other two casings.

The mechanical section is divided into three functional groups, as follows: to the left the recording and reproduction device 61, 93, in the centre the cancelling device 101, and to the right the replying device 31. These three functional groups are driven through three electro-magnetic clutches 11, 12 and 13 from a motor 311 and controlled by the automatic devices in casing 2. The Figs. 3 and 4 give a more detailed description of the three clutches. Each clutch is located in a housing 513, where it is held by at least two keys 14. When the clutch has been fitted into the housing, the keys are pulled up by tightening the nuts 15. The electro-magnetic part of the clutches consists of a cup magnet 16, with a magnetic core 17 which can move inside the cup magnet, and a coil 18. The leads of the coil are connected to terminals of a socket 4. A disk 20 with small axial teeth is fixed to the core 17. When the clutch is excited, the teeth of disk 20 engage in corresponding teeth of a disk 21 fixed to a shaft 5. The right hand end of the core is formed like a plate with a number of pins 22 arranged in a circle on the outer face. The pins engage with corresponding openings of a disk 25 fixed to a shaft 24. Thus there is between the driven shaft 24 and the magnet core a clutch connection which can be displaced axially, but which cannot be disengaged. A returning spring 26 for the core 17 is provided between the two disks 20 and 21. A detachable ball bearing is provided between core 17 and coil 18 to take up axial pressures. The ball bearing is designed so that a cage 29 guides the balls 30 in such a manner that small axial displacements of the two races 27, 28 cannot cause any disturbance. These clutches guarantee immediate and undelayed coupling of two shafts with a comparatively small magnetic output. This has over the usual magnetic friction clutches the advantage that a smaller source of D. C. is required and that only comparatively small forces occur in the clutch when it is in action. These forces are in this clutch neutralised by the ball bearing 27, 30, i. e. the proportions are such that the core 17 does not touch the cup magnet 16, and that the disks 20, 21 can approach only so much as is required for the correct engagement of their teeth.

Figs. 5 and 12 show more detailed views of the replying device. Through a clutch 11 (see Fig. 2) the drive is transmitted to a sound carrier assembly 33 and a cam assembly 32 with the cams 451–459. These two assemblies are driven together. Their motion is synchronous inasmuch as a complete revolution of the cam assembly corresponds to a complete cycle of the endless sound carrier band 34 of the sound carrier assembly 33. Consequently, when at rest, these two assemblies are always in the same corresponding positions. The cams 451–459 are driven through a worm and worm wheel 35, and the sound carrier band 34 is set in motion through spiral gearing 36. The latter drives a sprocket wheel 37, whose sprockets engage with corresponding perforations of the sound carrier band 34. This ensures that the sound carrier band 34 moves without slip in relation to the cam assembly 32. The sound carrier band 34 is pulled through the fixed speaking head 335 and a pressure device 39 adjustable by a screw 40. This consists of a leaf spring 41 and a band guide 42. The sound carrier band 34 is carried over a number of guide rolls 43, so that it takes up the smallest possible space. As the clutch 11 has a sudden action, and moves the sound carrier band 34 with a jerk, some rolls are fixed to a movable lever 44, which is controlled by a tensioning spring 45, so that the sound carrier band 34 is always slightly in tension. This lever moves when the clutch is thrown in and avoids an excessive increase in the band tension. The other part of the band, on the running-off side of the sprocket wheel 37, which now looses its tension, is taken up by a similar device consisting of a swinging lever 46, a spring roller 47 and a roller 48, which keeps it taut. This sound carrier assembly is mounted on its own base plate, so that it can be installed and removed as one unit. Here, too, all electrical leads are taken up vertically to socket connections. The cams 451–459 move their corresponding switches 54 (see Fig. 12) through push rods 52, which are lightly pressed against the cams by springs 53. The push rods 52 are located in the base plate 2' of the casing 2 with the automatic devices, but free to move in the base plate.

Fig. 6 is a more detailed view of the recording and reproduction device. The recording is done magnetically by a speaking head 336 on the endless wide sound carrier band 93. This is driven from the motor 311 through the clutch 13 and two pairs of gears 61', 91. The pair of gears 61' drives a threaded spindle 62 and the pair of gears 91 drives a sound carrier roll 92. The proportions are such that to each revolution of the threaded spindle 62 correspond so many revolutions of the sound carrier roll 92 that the sound carrier 93 moves just through one complete cycle. The sound carrier roll has at least at one end radial pins which engage with corresponding perforations of the sound carrier 93 and ensure a slip-free drive of the sound carrier. The sound carrier 93 is taken to the right over two guide rolls 95 and back over a tensioning roll which is provided near roll 92 and kept in tension by a spring 96. Opposite to the guide rolls 95 is a cancelling magnet 332. This arrangement ensures that the cancelling time for the sounds recorded on sound carrier 93 is only very short, because only a little more than the time taken for one half of a cycle of the sound carrier 93 is sufficient for this purpose. Rotation of the threaded spindle 62 advances the speaking head 336. It is fixed, but free to swing, to a ring 64' (see Fig. 9), to a lever 65 and an eye 66. All other parts for the forward and backward motion of the speaking head 336 are fixed to the ring 64. A screw 67 on the outer face of ring 64' permits adjustment of leaf spring 68, which holds speaking head 336 with the required pressure against the sound carrier band 93. Inside ring 64' are two cup magnets 69, 69' with coils 71, 71' and the cores 70, 70' each provided with one hole for the threaded spindle 62. Two eyes 72, 72' carry two levers 77, 77', which are controlled by two other levers 78, 78' pivoted on the cores 70, 70'. Two other eyes 73, 73' carry two more levers 74, 74', of which the free ends are each connected to one half of a divided nut 76, 76', which fits on the spindle 62. Each nut engages about one third of the circumference of the threaded spindle. Curved faces 75, 75' are provided on the backs of the nuts 76, 76', and the levers 77, 77' act against these curved faces through rollers 80, 80'. The levers 74, 74' are extended to the left (see Fig. 9) and are each controlled by one tension spring 82, 82', which have the tendency to lift the half-nuts 76, 76' from the threaded spindle 62. Also, the extended levers 74, 74' actuate the contacts 419 and 420—422. Lever 74 has also an extension to the right, 74" which is jointed to an arm 65 of the speaking head 336. Another spring 76" (see Fig. 10) acts on lever 74' also in the direction of the threaded spindle 62, with the tendency to push lever 74' backwards, in the direction opposite to the advance motion of the speaking head drive 64, so that it is pressed against the eye 73'. Finally, ring 64' is provided with a guide bar 64", which slides in a rail 85 and thus prevents rotation of the speaking head drive about its longitudinal axis and at the same time supports its weight, so that the threaded spindle 62 has practically nothing to carry. The action of the described mechanism shown in the Figs. 8 to 10 is as follows: In the rest position, i. e. when the two magnet coils 71, 71' are dead, all parts are in the positions shown in Figs. 8 and 9. In this position the cores 70, 70' are pressed by springs (not shown) against two stops 83, 83' firmly fixed to ring 64'. Nut 76 is in engagement with the threaded spindle 62, while threaded spindle 76' is not in engagement. Consequently, rotation of the threaded spindle 62 produces a displacement of the speaking head drive 64. When magnet 71' is excited, nut 76' is brought into engagement with the threaded spindle 62 through the pull of the magnet core 70', the two eyes 81', lever 78', lever 77', roller 80', and curved face 75'. Consequently, nut 76 will be disengaged through the action of the pull of magnet core 70, the two eyes 81, lever 78, lever 77, roller 80, and curved face 75, and that spring 82 will lift it by means of lever 74 from the spindle 62. At the same time the lever extension 74" will lift the speaking head 336 from the sound carrier 93. At this moment a return spring assembly 101 to 107 (see Figs. 6 and 7) which will be described later, will come into action, which will pull back the speaking head drive by one pitch of the thread on the threaded spindle 62. This is made possible by the play between lever 74' and eye 73" (see Fig. 10). Lever 74' then touches eye 73" (see Fig. 10). Obviously, the proportions could also be chosen so that the backward motion extends over more than one pitch. Meanwhile the coil 71 has been separated from the current supply and magnet core 70 has returned to the stop 83, so that nut 76 comes into engagement with the threaded spindle 62. As soon as this rest position has been attained, magnet 71' will be dead, too, and core 79 returns into its rest position, while the nut 76' disengages from the threaded spindle 62. Now the mechanism is again in the rest position shown in the Figs. 8 and 9. These movements result in the speaking head drive 64 moving back by one pitch on the threaded spindle 62. Since, however, one revolution of the spindle corresponds to a complete cycle of the sound carrier 93, it follows that the repositioning of the speaking head drive 64 or of the speaking head 336 by one pitch corresponds on the sound carrier 93 exactly to a repositioning by one sound track width. The repositioning of the speaking head, as described above, occurs automatically, when the recording of a message is completed, or intentionally, when parts of the text which were not properly understood have to be repeated. The latter possibility is a special advantage of the described mechanism. In order to return speaking head 336 for a repetition or a cancellation into its initial position, it is only necessary to excite the coil 71. As already described above, nut 76 is disengaged and the return spring assembly 101—107 pulls the speaking head drive 64 into the initial position. In the case of the repositioning by one pitch, as well as in the case of the return to the initial position, the speaking head 336 is lifted from the sound carrier 93, by means of a lever 74' and of the speaking head carrier arm 65, until the motion is completed, i. e. until coil 71 is again dead. The recording capacity of the sound carrier 93 is the greater, the longer and wider it is. The advance over the threaded spindle 62 has on account of its greater precision that advantage over the previously used curved disk, that the sound tracks can be moved closer together, so that a greater recording capacity is obtained. The above mentioned return spring assembly 101—107 (see Figs. 6 and 7) enables the greater band width of the sound carrier 93 to be utilised. The return spring system is provided with a pull cord 104 which leads over the roller 103 and is also fixed to it. The roller is fixed to a larger roller 102. To this roller a second pull cord 105 is fixed; it leads over two guide rollers 106 and 107 and is fixed to the speaking head drive 64. The interpolation of the double roller 102, 103, which exhibits a comparatively large ratio of diameters, enables a relatively short and stiff tension spring to be used. To damp the impact of speaking head drive 64, which is returned by tension spring 101, a pneumatic dashpot 111—115 is provided. It consists of a cylinder 111, in which a piston 112 can slide. A stop 113 limits the stroke of the piston. A springy tongue 114 is fixed to the piston 112, and another one 115 to the cup magnet 69', both tongues have an attachment at their free ends. These attachments serve to pull out the piston 112, until it comes up against the stop 113, when the speaking head drive 64 moves forward (this corresponds to a motion towards the left in Fig. 8). When piston 112 has reached the stop 113, the two attachments move past each other. In the case of the return motion of speaking head drive 64, which is to be damped, the two attachments slide past each other, and damping commences as soon as the springy tongue 114 is pushed towards the right by cup magnet 69'. This method ensures that damping is not effective for small forward motions of the speaking head drive 64, as piston 112 begins to function only when the attachments of the springy tongues 114, 115 have moved it at least a short distance in the direction towards stop 113. The damping becomes fully effective for the return motion only when the piston 112 has been pulled out of the cylinder 111 against the stop 113 during the forward motion. The undamped forward and return motion amounts to e. g. 50 mm. This scheme is necessary because in the case of a small forward motion the tension spring 101 would be only slightly stressed and the corresponding return impulse might be too small to overcome the damping effect and to ensure that speaking head drive 64 is returned accurately into the zero position.

The described mechanism has the advantage that it is simple, well ordered, and quite accessible. The clutches which are used in this design require only a small amount of D. C. power, they work quickly and are reliable. The use of endless sound carriers eliminates complicated reversing gears. At the same time, this scheme enables the recording and reproducing device to be switched back so that text parts of any length can be heard as often as one likes. There is a further advantage in the special method of guiding the speaking head by means of a threaded spindle, which allowed a better utilisation of the sound carrier capacity. Overstressing of the sound carrier, when the clutch is suddenly operated, is avoided by supporting the rolls on springs. This method has the advantage that the sound carrier can be started suddenly, without difficulty, and with the correct speed. There remains to be mentioned that the automatic devices, which have also been improved, do not employ unreliable mechanical timing units.

While the invention has been described in detail with respect to a now preferred example and embodiment of the invention, it will be understood by those skilled in the art after understanding the invention, that various changes and modifications may be made without departing from the spirit and scope of the invention and it is intended, therefore, to cover all such changes and modifications in the appended claims.

Having thus described our invention, we claim as new and desire to secure by Letters Patent:

1. In a telephonograph comprising, in combination, a replying device, a recording and reproducing device, a cancelling device, a motor for driving said devices, and mechanical switch-controlling cam means also driven by said motor, and automatic control apparatus including amplifiers and mechanical switches for controlling the aforesaid devices, a plurality of separable housings mounted one upon another in a vertical array, with said devices being mounted in one of said housings, said apparatus in an adjacent housing, and mechanical switch actuating means extending separably from said cam means in at least one of said housings to said switches in another of said housings for controlling the equipments from one housing to another.

2. A telephonograph in accordance with claim 1, in which said recording and reproducing device comprises a sound carrier in the form of a wide endless belt having a helical sound track, means for moving said belt at a fixed rate transversely to its width for recording and reproducing, a reproducing head, and means for moving said head at a much slower rate transverse to said belt in engagement with said sound track.

3. A telephonograph in accordance with claim 2, said motor having means for driving said band in a single direction only.

4. A telephonograph in accordance with claim 3, in which said wide band is perforated along one edge, and a sprocket wheel driven by said motor means for engaging in said band without slip via said perforated edge.

5. A telephonograph in accordance with claim 4, in which said means for driving the belt includes a driving roll, a pair of guide rolls, and a tensioning roll located adjacent said driving roll.

6. A telephonograph in accordance with claim 5, including a threaded spindle mounted parallel to said driving roll, said reproducing head being mounted for axial movement along said spindle and means for preventing rotation of said head on said spindle.

7. A telephonograph in accordance with claim 6, in which said head comprises a pair of levers, magnets controlling said levers and a pair of spindle nuts controlled by said levers for moving said head along said spindle.

8. A telephonograph in accordance with claim 7, and a spring and lever connected to said nut to displace the same along said spindle by at least one pitch of the thread thereon.

9. A telephonograph as in claim 8, said recording and said reproducing device comprising an endless sound carrier in the form of a wide band, a motor, an electromagnetic clutch and reduction gearing for said sound carrier driven by said gearing through said clutch, arranged to be driven in only one direction, a threaded spindle parallel with and next to said driving roll, a speaking head drive, a speaking head carried by said drive, and movable axially on said spindle but held against rotation, said speaking head drive comprising two magnets, two levers respectively operated by said magnets to press respectively each one segment of a spindle nut against said spindle, so that longitudinal motion of the speaking head drive takes place when said nut is pressed against said spindle and said spindle rotates, a cam at the end of said spindle, a contact in the magnetising current circuit of said speaking head drive, so controlled by said cam that this contact opens on the return of said speaking head drive into its zero position at that point where said speaking head is exactly opposite the initial point of said sound track.

10. A telephonograph comprising, in combination, a replying device, a recording and reproducing device, a cancelling device, housings for said devices, and automatic control apparatus for said devices, a wide band endless sound carrier, motor means for driving said band, a threaded spindle disposed cross-wise of said band, a reproducing head carried on said spindle for movement across said band, a return spring, a pair of pull cords, and a double roller having sections of two different diameters carrying said cords, said cords being connected between said spring and said head so as to urge said head toward its zero position, and means for moving said head away from said wide band during return movement along said spindle, said automatic control apparatus comprising means for initiating return action of said head by said spring in response to an incoming coded sound signal.

11. A telephonograph in accordance with claim 10, and dashpot means for damping the impact of said head during its return to zero position.

12. A telephonograph in accordance with claim 11, and lost-motion spring means between said dashpot and said head, whereby said dashpot is effective only if said head has moved more than a predetermined distance from its zero position.

13. A telephonograph in accordance with claim 12, and contact means opened during a recording when the recording capacity is exhausted, to prevent return motion of the reproducing head along said spindle.

14. A telephonograph in accordance with claim 12, said replying device including a second sound carrier in the form of a narrow band with perforated edge, a drive sprocket for said band, at least one tensioning device for said band, including a roller to guide said band, and a spring-urged lever carrying said roller to provide elastic tension during starting.

15. A telephonograph in accordance with claim 14, and a fixed reproducing head adjacent said band.

16. A telephonograph in accordance with claim 15, including a spring urged lever, a tensioning device comprising a roller carried by said lever, and elastic pressure means for urging said reproducing head against said band.

17. A telephonograph in accordance with claim 1, and an electro-magnetic clutch and reduction gearing driven by said motor, a drive roll, a sound carrier on said drive roll driven by said gearing in one direction only, a second clutch, a cam shaft driven by said gearing through said clutch, a replying device driven from said cam shaft, a cancelling device, and a clutch-controlled cam shaft, connected to operate said cancelling device, and means for selectively actuating the respective clutches to control the respective associated mechanisms.

18. A telephonograph in accordance with claim 17, in which said clutch-controlled cam shaft is controlled by a magnetic clutch comprising a rotatable core and an axially movable member connected fast to a clutch disc provided with axially extending teeth.

References Cited in the file of this patent

UNITED STATES PATENTS

| Number | Name | Date |
|---|---|---|
| 2,171,366 | Hipple | Aug. 29, 1939 |
| 2,284,173 | Soukup et al. | May 26, 1942 |
| 2,374,842 | Shively et al. | May 1, 1945 |
| 2,490,771 | Begun | Dec. 13, 1949 |
| 2,519,568 | Handschin | Aug. 22, 1950 |
| 2,519,597 | Owens | Aug. 22, 1950 |
| 2,549,548 | Von Zimmermann | Apr. 17, 1951 |